(12) United States Patent
Lewis et al.

(10) Patent No.: US 9,432,370 B2
(45) Date of Patent: Aug. 30, 2016

(54) SECURED TRANSMISSION OF A SEQUENCE OF DATA TO BE TRANSMITTED

(71) Applicant: Robert Bosch GmbH, Stuttgart (DE)

(72) Inventors: Matthew Lewis, Reutlingen (DE); Benjamin Glas, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 55 days.

(21) Appl. No.: 14/273,051

(22) Filed: May 8, 2014

(65) Prior Publication Data

US 2014/0337627 A1 Nov. 13, 2014

(30) Foreign Application Priority Data

May 13, 2013 (DE) .......................... 10 2013 208 730

(51) Int. Cl.
*H04L 29/06* (2006.01)
(52) U.S. Cl.
CPC ......... *H04L 63/0876* (2013.01); *H04L 63/123* (2013.01)
(58) Field of Classification Search
CPC .................. H04L 63/123; H04L 63/0876
USPC ......................................................... 713/170
See application file for complete search history.

(56) References Cited

U.S. PATENT DOCUMENTS

| 2002/0011099 A1* | 1/2002 | Domens | G01L 23/18 73/114.04 |
| 2008/0130881 A1* | 6/2008 | You | H04L 9/0637 380/46 |
| 2010/0293372 A1* | 11/2010 | Fischer | H04W 12/06 713/168 |

FOREIGN PATENT DOCUMENTS

DE    10 2009 002 396    10/2010

* cited by examiner

*Primary Examiner* — Kambiz Zand
*Assistant Examiner* — Aubrey Wyszynski
(74) *Attorney, Agent, or Firm* — Norton Rose Fulbright US LLP

(57) ABSTRACT

A method for transmitting a sequence of data blocks to be transmitted includes: one first piece of authentication data and one second piece of authentication data different from the first are formed relative to a selected data block; the selected data block, the first piece of authentication data and the second piece of authentication data are transmitted to a receiver; and the receiver checks (i) a validity of the received data block with the aid of the received first piece of authentication data and (ii) a validity of the received first piece of authentication data with the aid of the received second piece of authentication data.

14 Claims, 1 Drawing Sheet

SECURED TRANSMISSION OF A SEQUENCE OF DATA TO BE TRANSMITTED

BACKGROUND OF THE INVENTION

1. Field of the Invention

The present invention relates to a method for transmitting a sequence of data to be transmitted. Even though the present invention is described below essentially with reference to a transmission of sensor data to an engine control unit, it is not limited to this application, but is always advantageously applicable when a sequence of data to be transmitted is to be secured, in particular when a continuous or frequent transmission of data takes place. In addition to transmitting sensor data of an internal combustion engine, other applications may be found in the generalized embedded field, such as in other control units in the automobile (body computer, driver assistance computer, . . . ) or in the case of applications outside the automotive sector which require either a permanent sensor communication (for example, fire alarm systems or the like) or a constant communication in general (not only with one participating sensor).

2. Background of the Invention

The task of an engine control unit of an internal combustion engine consists of calculating output variables for the actuators, such as fuel injector or ignition system, from a plurality of input signals, such as rotational speed, temperature or pressure. Thus, for a safe operation of the internal combustion engine controlled by the control unit, the input signals received by the control unit must be correct. For example, disruptions in the data transmission should be detectable.

Another aspect relates to a change of input signals for increasing performance (so-called tuning). For this purpose, the input signals are changed in a way that results in increased engine performance. For example, sensor values from pressure sensors (pressure scavenging in a common rail, air pressure in an intake manifold, etc.) may be artificially reduced so that the control unit responds by boosting pressure and thereby increasing performance.

Both a faulty transmission of data as well as the tuning entails considerable risks. For example, excessive temperatures, pressures and rotational speeds as well as excessive stress on the power train and the braking system may result in defects. Furthermore, a deterioration in the exhaust gas values may occur. For this reason, it is desirable to ensure a correct data transmission.

In this context, a method for a secure transmission of sensor data is described in Published German patent application document DE 10 2009 002 396 A1 in which the sensor data are transmitted with the aid of a MAC method (message authentication code). In order in this case to prevent replay attacks in which earlier values are recorded and retransmitted at a later point in time, the sensor data are augmented by individual additions, such as a time code or a random number previously ascertained by the control unit at the sensor. This has the disadvantage that the sensor must either have a highly accurate time source or must have the option of receiving data from the control unit.

It is desirable to have at ones disposal a method for a secure transmission of a sequence of data to be transmitted, in particular sensor data, which may also be used in conjunction with simple communication devices, such as sensors, which does not have these options.

BRIEF SUMMARY OF THE INVENTION

The present invention serves essentially to secure a data block which may, for example, be made up of multiple sensor values, (at least partially) with the aid of at least two different pieces of authentication data, which are preferably formed as a MAC. Here, multiple data blocks are directly or indirectly linked in one piece of authentication data via other pieces of authentication data. This has the advantage that only a cohesive data stream results in valid authentication data.

In this way, for example, replay attacks may be easily detected, since older previously transmitted data blocks together with their pieces of authentication data are not properly matched with the prevailing data blocks.

According to a first aspect of the present invention, a first level of authentication data of a first type and a second level of authentication data of a second and/or third type may be provided. A piece of authentication data of the second type is used to form multiple data blocks; a piece of authentication data of the third type is used to form multiple authentication data of the first type. Each of the pieces of authentication data of the first type is in turn used to form a data block to be transmitted. This means that the substitution and/or insertion of single or multiple data blocks is/are detected even with the correct MAC (=piece of authentication data of the first type) since the higher-ranking MAC (=piece of authentication data of the second or third type) is different.

According to another aspect of the present invention, the authentication data of a fourth type may be formed, a first piece of authentication data of the fourth type and a second piece of authentication data of the fourth type being used (at least partially) to form the same data block. For example, the first piece of authentication data of the fourth type may be used to form a first data block and at least one piece of data of a second data block; the second piece of authentication of the fourth type may be used to form the second data block and at least one piece of data of the third data block. In this case, the first and the second data block are not the same data blocks. If continued successively, this forms an unbroken chain of data blocks and authentication data, the substitution and/or insertion of another data block rendering the authentication data involved inaccurate.

According to another aspect of the present invention, authentication data of a fifth type may be formed, in which each piece of authentication data of the fifth type includes a data block and a further piece of authentication data of the fifth type. In this specific embodiment as well, the insertion and/or substitution of a data block is easily detectable.

According to another aspect of the present invention, it is provided that at least two counter values in addition to the data block are used for the calculation of an associated piece of authentication data. In this case, an initial value of at least one of the two counter values is randomly predefined. The counter values are usually set at the start of the data transmission, i.e., when switching on the control unit. During operation, the counter values are incremented for each data block. The result of this configuration is that one particular combination of the at least two counter values is highly unlikely to occur a second time. In this way as well, replay attacks may be easily prevented.

A processing unit according to the present invention, in a motor vehicle, for example, designed as a sensor, for example, a pressure sensor, is configured to carry out a method according to the present invention.

Implementation of the method in the form of software is also advantageous, since this results in particularly low costs, in particular if a performing control unit is also used for other tasks and is therefore present anyway. Suitable data carriers for providing the computer program are, in particular, diskettes, hard drives, flash memories, EEPROMs, CD-ROMs, DVDs and so on. Downloading a program over a computer network (Internet, Intranet etc.) is also possible.

It is understood that the features cited above and those to be explained below are applicable not only in each specified combination, but also in other combinations or alone, without departing from the scope of the present invention.

The present invention is schematically represented in the drawing based on specific exemplary embodiments and is described in greater detail below with reference to the drawing.

DETAILED DESCRIPTION OF THE INVENTION

Figure 1:
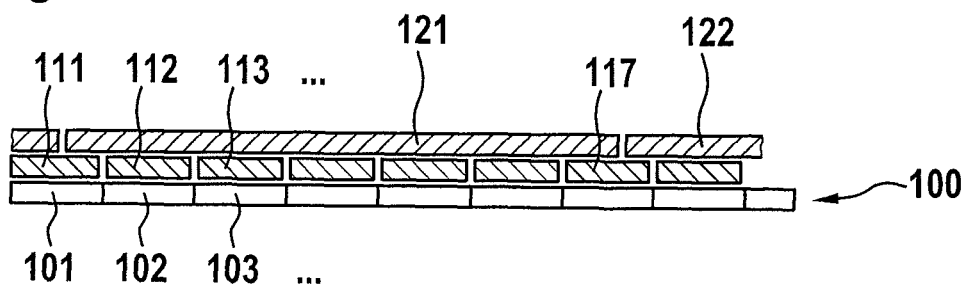
FIG. 1 schematically shows sensor data and authentication data according to a first specific embodiment of the present invention.

Schematically represented in the figures are data to be transmitted which result according to various specific embodiments of the present invention. Here, identical elements are indicated with identical reference numerals.

Each of the pieces of data to be transmitted contains sensor data 100, which are composed of a sequence of sensor data blocks 101, 102, 103, . . . . Each sensor data block may be composed of one or multiple sensor data values, such as pressure values or the like.

In the specific embodiment illustrated in FIG. 1 a first piece of authentication data 111, 112, 113, . . . , configured here as a MAC, is formed relative to each sensor data block 101. Here, it is possible to employ conventional methods, based in particular on block codes or on hash functions. One such first piece of authentication data is referred to as a piece of authentication data of a first type. In the example shown, one piece of authentication data is formed relative to each whole or completed sensor data block.

In addition, second pieces of authentication data 121, 122, . . . , also configured as a MAC, are also formed, each second piece of authentication data being directly formed relative to at least two sensor data blocks 101, 102, 103, . . . and therefore indirectly also relative to at least two first pieces of authentication data. Such a second piece of authentication data is referred to as a piece of authentication data of a second type. A piece of authentication data of a second type may also be formed relative to multiple whole sensor data blocks or relative to only parts of the multiple sensor data blocks.

Alternatively, each second piece of authentication data may also be directly formed relative to at least two first pieces of authentication data and therefore indirectly also relative to at least two sensor data blocks 101, 102, 103, . . . . Such a second piece of authentication data is referred to as a piece of authentication data of a third type. A piece of authentication data of the third type may be formed relative to multiple whole pieces of authentication data of the first type or relative to only parts of the multiple pieces of authentication data of the first type.

In the preferred specific embodiment shown, at least two pieces of authentication data of the second type are also formed relative to specific pieces of authentication data of the first type, as is depicted in FIG. 1 for piece of authentication data 117 of the first type at the boundary between two pieces of authentication data 121 and 122 of the second type. This is repeated for each contiguous pair of pieces of authentication data of the second type, so that an uninterrupted transmission of sensor data blocks 101, 102, 103, . . . may be ensured. The two contiguous pieces of authentication data of the second type may each be formed relative to the whole or to identical or to different parts of the sensor data block.

Figure 2:
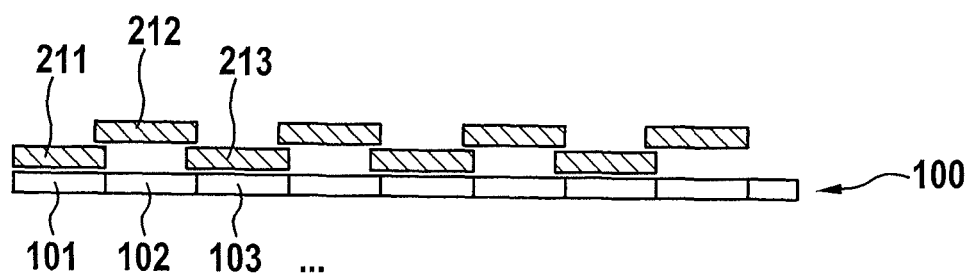
FIG. 2 schematically shows sensor data and authentication data according to a second specific embodiment of the present invention.

In the specific embodiment represented in FIG. 2, identical pieces of authentication data of a fourth type, also configured as a MAC, are formed as first and second pieces of authentication data 211, 212, 213, . . . . In contrast to the pieces of authentication data of the first type shown in FIG. 1, however, a piece of authentication data of the fourth type is not formed relative to a completed sensor data block 101, 102, 103, . . . , but rather each piece of authentication data of the fourth type includes at least one piece of sensor data from one first sensor data block (in this case a prevailing sensor data block) and one piece of sensor data from one second sensor data block (in this case the preceding sensor data block). Thus, one piece of authentication data of the fourth type is formed (at least partially) relative to two different sensor data blocks. Preferably, the piece of authentication data of the fourth type includes the entire prevailing sensor data block. The result of this, namely, is that a link is created between two successive pieces of authentication data with the aid of the piece of sensor data which, as a piece of sensor data from the preceding sensor data block, is included in the next piece of authentication data. At least one piece of sensor data must be included in two pieces of authentication data of the fourth type in order to ensure a link. An uninterrupted transmission of sensor data may be ensured in this way as well.

Figure 3:
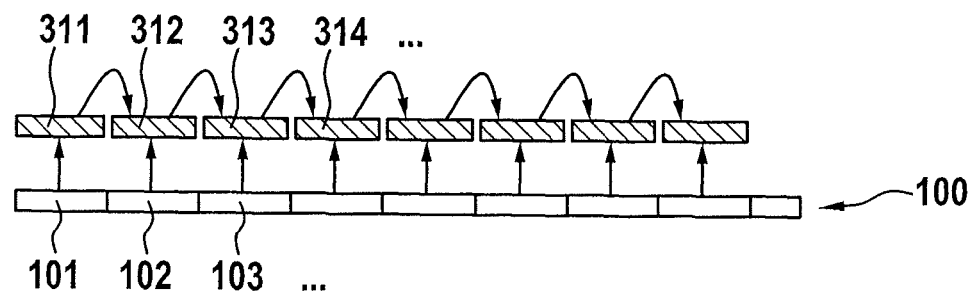
FIG. 3 schematically shows sensor data and authentication data according to a third specific embodiment of the present invention.

Finally, a specific embodiment is shown in FIG. 3 in which first and second pieces of authentication data 312, 313, 314, . . . are formed as identical pieces of authentication data of a fifth type.

A piece of authentication data 312, 313, 314, . . . of the fifth type is in each case formed relative to the associated sensor data block 102, 103, as well as to the respective preceding piece of authentication data 311, 312, 313, . . . of the fifth type (and therefore indirectly also relative to the preceding sensor data block). In this way, an uninterrupted sensor data transmission may be ensured.

In general, it is always possible within the scope of the present invention to verify the validity of sensor data on the basis of authentication data and vice versa. Thus, if a discrepancy is noted between sensor data blocks, first pieces of authentication data and second pieces of authentication data, the sensor data blocks may be rejected or characterized as invalid, without having to explicitly establish which of the data involved ultimately are changed. In this case, an internal combustion engine may, for example, switch to emergency operation or on the other hand simply store the detected manipulation in order to be able use this later when asserting any alleged warranty claims.

What is claimed is:

1. A method for transmitting at least one data block in a sequence of data blocks to be transmitted, comprising:

forming at least one first piece of authentication data configured as a message authentication code and associated with a selected data block;

forming at least one second piece of authentication data configured as a message authentication code and associated with the selected data block, the one second piece of authentication data being different from the one first piece of authentication data; and transmitting the selected data block, the first piece of authentication data and the second piece of authentication data to a receiver configured to (i) check a validity of the received selected data block with the aid of at least one of the received first piece of authentication data and the received second piece of authentication data, and (ii) check a validity of the received first piece of authentication data with the aid of the received second piece of authentication data.

2. The method as recited in claim 1, wherein the receiver checks the validity of the received data block with the aid of the received first piece of authentication data.

3. The method as recited in claim 1, wherein the second piece of authentication data is associated with the selected data block and at least one other data block.

4. The method as recited in claim 1, wherein at least one of the first and second pieces of authentication data is associated with the selected data block and at least two counter values, an initial value of at least one of the at least two counter values being randomly predefined.

5. The method as recited in claim 3, wherein the first piece of authentication data is a piece of authentication data of a first type and associated with the selected data block, and the second piece of authentication data is a piece of authentication data of a second type associated with the selected data block and the at least one other data block.

6. The method as recited in claim 5, wherein at least two pieces of authentication data of the second type are associated with the selected data block.

7. The method as recited in claim 1, wherein the first piece of authentication data is a piece of authentication data of a first type and associated with the selected data block, and the second piece of authentication data is a piece of authentication data of a further type associated with the piece of authentication data of the first type.

8. The method as recited in claim 7, wherein the piece of authentication data of the further type is associated with at least two pieces of authentication data of the first type.

9. The method as recited in claim 7, wherein two pieces of authentication data of the further type are associated with at least one piece of authentication data of the first type.

10. The method as recited in claim 3, wherein the first piece of authentication data and the second piece of authentication data are each a piece of authentication data of a selected type, one piece of authentication data of the selected type being associated with two different data blocks.

11. The method as recited in claim 3, wherein the first piece of authentication data and the second piece of authentication data are each a piece of authentication data of a selected type, one first piece of authentication data of the selected type being associated with one data block and one second piece of authentication data of the selected type.

12. The method as recited in claim 3, wherein measuring values of a sensor of an internal combustion engine are transmitted as data.

13. A method for transmitting at least one data block in a sequence of data blocks to be transmitted, comprising:
  forming, by a transmitter, at least one first piece of authentication data associated with a selected data block and with at least two counter values associated with the transmitter, wherein an initial value of at least one of the at least two counter values is randomly predefined;
  transmitting the selected data block and the first piece of authentication data to a receiver configured to check a validity of the received data block with the aid of the received first piece of authentication data and the at least two counter values.

14. A non-transitory computer-readable data storage medium storing a computer program having program codes which, when executed on a computer, perform a method for transmitting at least one data block in a sequence of data blocks to be transmitted, the method comprising:
  forming at least one first piece of authentication data configured as a message authentication code and associated with a selected data block;
  forming at least one second piece of authentication data configured as a message authentication code and associated with the selected data block, the one second piece of authentication data being different from the one first piece of authentication data; and
  transmitting the selected data block, the first piece of authentication data and the second piece of authentication data to a receiver configured to (i) check a validity of the received selected data block with the aid of at least one of the received first piece of authentication data and the received second piece of authentication data, and (ii) check a validity of the received first piece of authentication data with the aid of the received second piece of authentication data.

* * * * *